US010771354B1

(12) United States Patent
Gulati et al.

(10) Patent No.: US 10,771,354 B1
(45) Date of Patent: Sep. 8, 2020

(54) DIGITAL PLATFORM FOR MULTIPLE NETWORK DEPLOYMENTS

(71) Applicant: LotusFlare, Inc., Sunnyvale, CA (US)

(72) Inventors: Kunal Gulati, Castro Valley, CA (US); Qing Terry Guo, Mountain View, CA (US); Shao Yong Xia, Fremont, CA (US); Yuheng Jiang, Santa Clara, CA (US)

(73) Assignee: LOTUSFLARE, INC., Sunnyvale, CA (US)

( * ) Notice: Subject to any disclaimer, the term of this patent is extended or adjusted under 35 U.S.C. 154(b) by 0 days.

(21) Appl. No.: 16/675,066

(22) Filed: Nov. 5, 2019

(51) Int. Cl.
*G06F 15/177* (2006.01)
*H04L 12/24* (2006.01)

(52) U.S. Cl.
CPC ........ *H04L 41/5045* (2013.01); *H04L 41/508* (2013.01)

(58) Field of Classification Search
USPC ....................................................... 709/220
See application file for complete search history.

(56) References Cited

U.S. PATENT DOCUMENTS

| 6,728,748 | B1* | 4/2004 | Mangipudi | ......... H04L 41/5009 709/226 |
| 6,778,821 | B1* | 8/2004 | Shunk | ............... H04M 3/42144 379/15.03 |
| 7,209,977 | B2* | 4/2007 | Acharya | ........... H04L 29/12009 370/395.3 |
| 8,326,673 | B1* | 12/2012 | Biere | ..................... G06Q 30/02 705/7.29 |
| 8,396,990 | B2* | 3/2013 | Cremin | ............... H04L 61/1511 709/245 |
| 8,755,797 | B2* | 6/2014 | Ahmavaara | ............. H04W 8/04 455/435.1 |
| 8,949,597 | B1* | 2/2015 | Reeves | ................. H04L 9/3268 713/156 |
| 9,021,383 | B2* | 4/2015 | Caliendo, Jr. | ....... G06F 16/9577 715/781 |
| 9,141,724 | B2* | 9/2015 | Cremin | ................... H04L 67/04 |
| 9,472,861 | B2* | 10/2016 | Bi | .......................... H01Q 21/28 |
| 9,514,107 | B1* | 12/2016 | Boswell | .................. G06F 40/14 |
| 9,558,288 | B1* | 1/2017 | Boswell | ............... G06F 16/958 |
| 9,928,475 | B2* | 3/2018 | Burnett | .............. G06F 3/04842 |
| 9,998,912 | B2* | 6/2018 | Ashok | .................. H04W 8/183 |
| 10,165,089 | B2* | 12/2018 | Cohan | .................. H04L 67/125 |

(Continued)

*Primary Examiner* — Alicia Baturay
(74) *Attorney, Agent, or Firm* — Elliot H. Karlin; Hickman Palermo Becker Bingham LLP

(57) ABSTRACT

Systems and methods for providing a network management platform for managing a plurality of deployments are described herein. In an embodiment, a server computer receives a request to generate a plurality of network deployments, including first interface elements and rules for a first network deployment and second interface elements and rules for a second network deployment. The server computer sends the first network deployment to a first plurality of client computing devices and sends the second network deployment to a second plurality of client computing devices. When the server computer receives network usage data from the first and second plurality of computing devices, the server computer provides the network usage data to a network operation with an identification of a corresponding deployment.

21 Claims, 7 Drawing Sheets

(56) References Cited

U.S. PATENT DOCUMENTS

| | | | |
|---|---|---|---|
| 2016/0012391 A1* | 1/2016 | Burnett | G06Q 40/08 705/336 |
| 2016/0203437 A1* | 7/2016 | Burnett | G06Q 40/08 705/4 |
| 2016/0203439 A1* | 7/2016 | Burnett | G06Q 10/0834 705/334 |
| 2016/0224935 A1* | 8/2016 | Burnett | G06Q 10/0834 |
| 2019/0121827 A1* | 4/2019 | Boswell | G06F 16/284 |

* cited by examiner

US 10,771,354 B1

DIGITAL PLATFORM FOR MULTIPLE NETWORK DEPLOYMENTS

FIELD OF THE DISCLOSURE

One technical field of the present disclosure is computer-implemented provisioning and management of cellular radio telephone networks. Another technical field of the present disclosure is managing a plurality of cellular network deployments through a single software platform.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section. Further, it should not be assumed that any of the approaches described in this section are well-understood, routine, or conventional merely by virtue of their inclusion in this section.

In the digital age, it has become increasingly important for telecommunications operators to provide diverse network usage experiences to appeal to a large number of different types of network users. Thus, telecommunications operators often create multiple network deployments focused on different user experiences. For instance, a telecommunications operator may create a plurality of brands, each brand targeting a different population segment and each brand including different design elements, rules and features.

Generating network deployments often involves a large amount of work that is performed before the deployments are usable. For each network deployment, a separate set of server computers running a separate network stack have to be provisioned to handle the startup of the network deployment. Websites, apps and front-end stores are generally managed separately and can require their own management software, personnel, and data storage space.

Virtual network enabler software packages exist for managing singular network deployments, but have their own limitations. Firstly, the virtual network enabler software packages can only support a singular deployment per network operator with features relating to only tracking the singular deployment. The virtual network enabler software packages do not include flexibility to create different deployments from an existing deployment, thereby restricting an existing deployment to the single set of front-end interface elements, rules, and support options. Second, the virtual network enabler software packages provide digital operations management tools, but no front-end management tools. Thus, additional software packages for front-end management must be used and synchronized with the digital operations layer of the virtual network enabler software packages. Third, while virtual network enabler software packages can be used to create deployments for different networks, they are unable to use a plurality of networks to support a single deployment.

Thus, there is a need for a software package which facilitates the generation of a plurality of network deployments and allows both back-end and front-end management of the plurality of network deployments.

SUMMARY

The appended claims may serve as a summary of the disclosure.

DETAILED DESCRIPTION

Figure 1A:
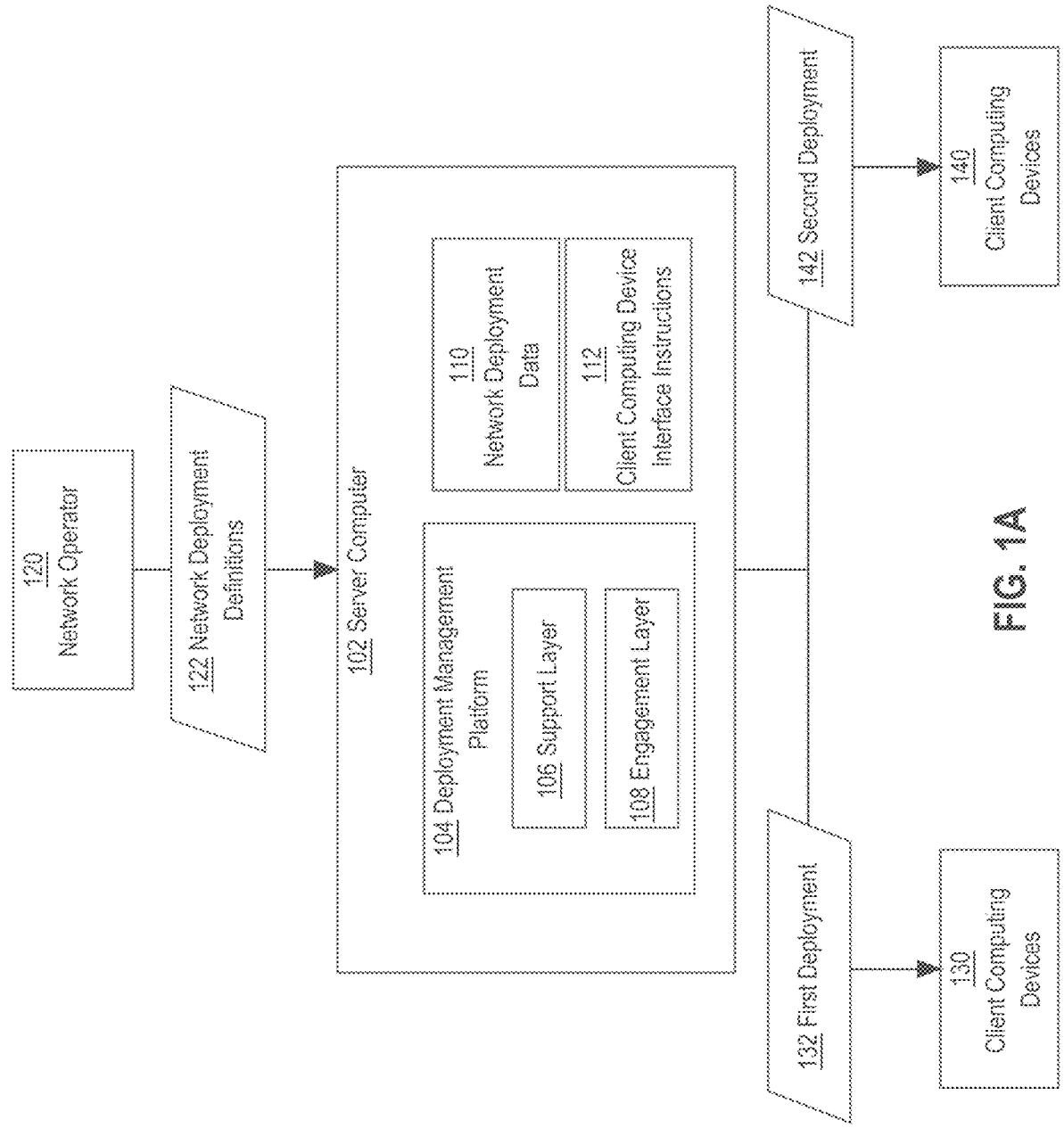
FIG. 1A depicts an example networked system for providing a plurality of deployments

In the following description, for the purposes of explanation, numerous specific details are set forth in order to provide a thorough understanding of the present disclosure. It will be apparent, however, that embodiments may be practiced without these specific details. In other instances, well-known structures and devices are shown in block diagram form in order to avoid unnecessarily obscuring the present disclosure.

General Overview

Systems and methods for facilitating generation and management of a plurality of network deployments are described. According to an embodiment, a server computer provides an infrastructure agnostic deployment management platform with multi-client capability. The deployment management platform comprises copies of computer programs that are programmed to interoperate, termed a 'software stack' or just 'stack', which includes both backend and frontend management features. As the deployment management platform includes multi-client capabilities, it can be used to facilitate a plurality of network deployments. Data received relating to a network deployment is tagged with an identifier of the network deployment. While each network deployment utilizes the same network, data relating to each network deployment may differ and may be changed through the deployment management platform.

A deployment, in this context, may comprise a stored association of digital data, such as in a database, comprising particular design elements, rules and substantive software, communications or other technical features that define the deployment. A deployment also may comprise configuration data defining a set of server computers running a network stack and provisioning instructions that are programmed to handle the startup of the network deployment. In some embodiments, a deployment may comprise data defining websites, front-end stores management software, and data storage space.

In an embodiment, a method comprises receiving, through a network management platform from a network computing device, a request to generate a plurality of network deployments, each of the network deployments utilizing a particular digital communication network; receiving, through the network management platform from the network computing device, data specifying first interface elements and first rules for a first network deployment and second interface elements and second rules for a second network deployment; sending the first network deployment to a first plurality of client computing devices, the first network deployment including the first interface elements and first rules; sending the second network deployment to a second plurality of client computing devices, the second network deployment including the second interface elements and second rules; receiving first network usage data from the first plurality of computing devices based upon using the first network deployment and receiving second network usage data from the second plurality of computing devices based upon using the second network deployment; providing, to the network computing device, the first network usage data with an identification of the first network deployment and the second network usage data with an identification of the second network deployment.

A "computer" may be one or more physical computers, virtual computers, or computing devices. As an example, a computer may be one or more server computers, cloud-based computers, cloud-based cluster of computers, virtual machine instances or virtual machine computing elements such as virtual processors, storage and memory, data centers, storage devices, desktop computers, laptop computers, mobile devices, or any other special-purpose computing devices. Any reference to "a computer" herein may mean one or more computers, unless expressly stated otherwise.

Structural Overview

FIG. 1A depicts an example networked system for providing a plurality of deployments. Network operator 120, server computer 102, and client computing devices 130 and 140 are communicative coupled over one or more networks.

Network operator 120 comprises one or more server computers that operate one or more networks which facilitate communication between a plurality of computing devices. In an embodiment, network operator 120 operates a cellular computer network. The cellular computer network may act as an internet service provider (ISP) through which computing devices may interact.

Network operator 120 sends network deployment definitions 122 to server computer 102. Network deployment definitions 122 comprise data defining interface elements and/or rules for different network deployments. Network operator 120 may send the network deployment definitions 122 to server computer 102 through a deployment management platform 104 provided by the server computer 102.

Server computer 102 comprises a server computer that receives and responds to requests from network operator 120 and client computing devices 130, 140. Server computer 102 may be configured to intercept requests to use a network operated by network operator 120 and/or intercept requests to communicate with network operator 120 from client computing devices 130, 140. The server computer 102 may be a computer that receives requests for data and responds with data. For example, a web server computer may be an HTTP-based computer that receives HTTP requests and responds with data comprising HTML or JavaScript instructions. The server computer 102 may comprise a plurality of physical and/or virtual server computers that are configured to communicate with client computing devices 130, 140 and network operator 120.

Server computer 102 comprises deployment management platform 104, network deployment data 110, and client computing device interface instructions 112. Deployment management platform 104 comprises a software platform comprising features which facilitate the generation, deployment, and management of different network deployments. The deployment management platform 104 is described further herein with reference to FIG. 1B.

Network deployment data 110 comprises data relating to different network deployments. Network deployment data 110 may comprise rules relating to the network deployments, such as network usage rates, network data usage limits, messaging usage limits, voice usage limits, network plan pricing, or network speeds, network deployment design data, such as interface elements, logos, backgrounds, or other design features, and/or data relating to network deployment usage, such as data relating to user accounts corresponding to a network data, general usage of a network through a deployment, and other data relating to the usage of the network deployment.

Client computing device interface instruction 112 comprises computer readable instructions which, when executed by the server computer, cause the server computer to cause display of an interface on the client computing device relating to a particular network deployment. The interface displayed to the client computing devices 130 and 140 may comprise different interface elements, such as logos, banners, and other design elements, based on the network deployment received.

Server computer 102 sends a first deployment 132 to client computing devices 130 and a second deployment 142 to client computing devices 140. Client computing devices 130, 140 comprise computers including hardware capable of communicatively coupling client computing devices 130, 140 to one or more server computers, such as server computer 102 or network operator 120, over one or more service providers, such as network operator 120. For example, client computing devices 120, 140 may include cellular radios that communicate with server computer 102 or network operator 120 through an operator network provided by network operator 120. The client computing devices 130, 140 may also include network cards that communicate with server computer 102 or network operator 120 through a home or office wireless router (not illustrated in FIG. 1) coupled to an internet service provider.

Deployment Management Platform

Figure 1B:
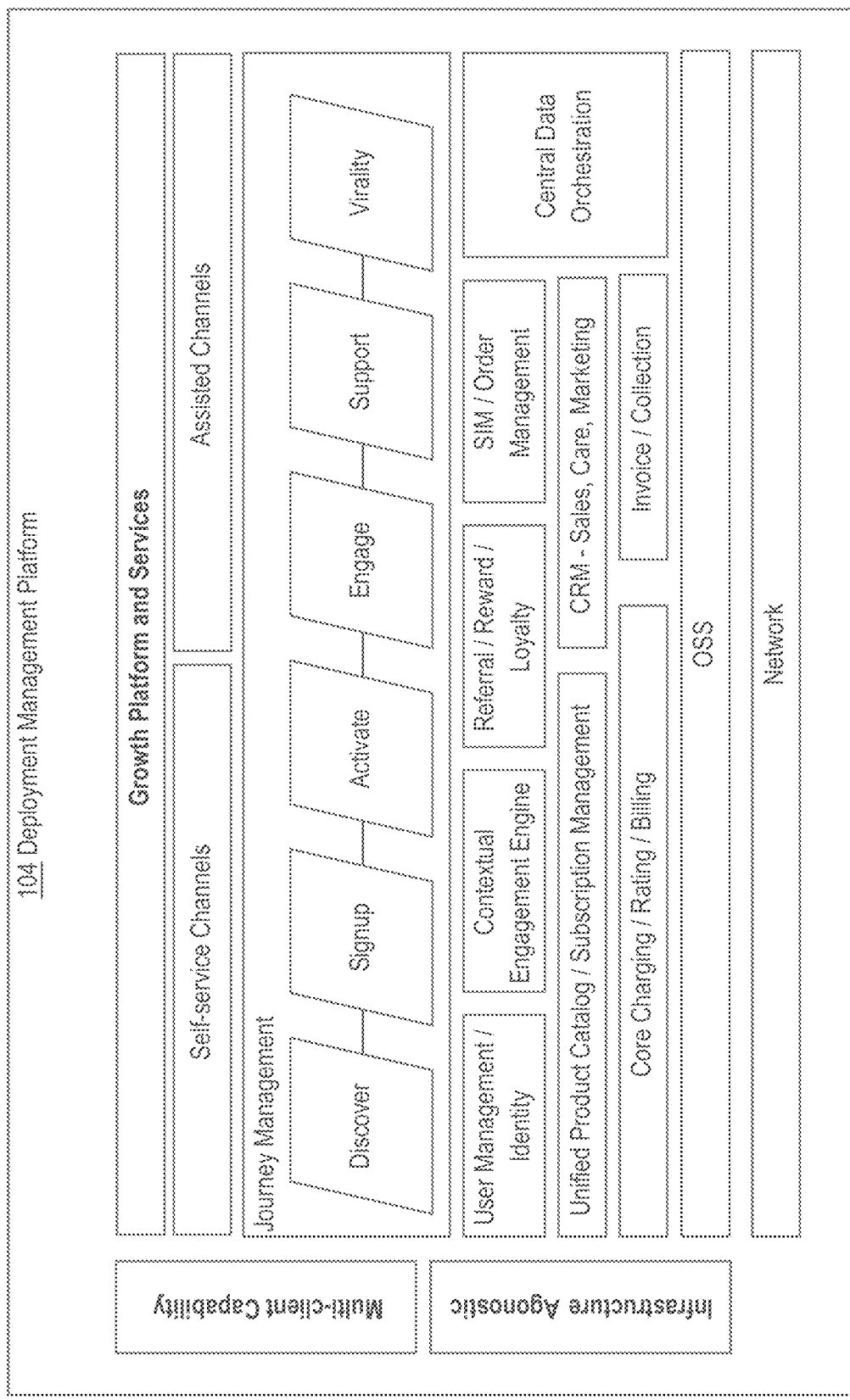
FIG. 1B depicts an example stack architecture of a deployment management platform.

FIG. 1B depicts an example stack of a deployment management platform 104. As shown in FIG. 1B, the stack of the deployment management platform 104 is built to be infrastructure agnostic with multi-client capability. Thus, the stack is designed to work with any network operator regardless of the infrastructure used by the network operator.

At a bottom layer of the stack sits the network operated by the network operator. The network may comprise a cellular computer network or an internet service provider. On top of the network layer sits the operations support systems (OSS) layer used to manage the network. The OSS layer may include functions such as network inventory, service provisioning, network configuration, and fault management.

Above the OSS layer sits layers related to management of a plurality of different network deployments. The core charging/rating/billing layer includes features for setting charges for different deployments, rates, such as data and mobile network rates, and generating deployment specific bills. The invoice/collection layer similarly includes features for generating invoices for work performed and collection of invoice or billing debts.

The unified product catalog/subscription management layer comprises features relating to a product catalog for a specific deployment and management of subscriptions of the deployment. The unified product catalog features may include identifications of features supplied for a particular deployment, such as network speeds and data caps. The subscription management features may include data identifying a plurality of subscription options including variable features within the subscription options. The subscription management features may additionally include software with options for linking a user account to a specific subscription, modifying a subscription of a user, and otherwise tracking, modifying, or generating different subscriptions.

The customer relationship manager (CRM) layer comprises features for sales, care, and marketing. The features in the CRM layer allow for dynamic pricing of different packages of a deployment, generating deployment specific advertising, and targeted offers for a specific deployment. Thus, the CRM layer provides software features for providing information to potential or new customers regarding a particular deployment.

The user management/identity layer comprises features for tracking engagement with particular users, including unique user identifiers, device identifiers, group identifiers, such as a plurality of users on a family plan, user history including past network usage and technical support, and other stored data relating to particular users and their use of the network. Relating to the user management/identity layer is the contextual engagement engine which identifies one of a plurality of contexts of a user and provides options for engaging with the user based on the context. For instance, the system may identify that a user has recently viewed a bill prior to seeking support and provide options for engagement with the user relating to billing.

The referral/reward/loyalty layer comprises features for generating offers and rewards for referring other uses to a deployment and/or for participating in a loyalty program where rewards are offered for repeated customer activities. The referral/reward/loyalty lay may comprise options for generating the offers, advertising the offers, identifying eligible users who have fulfilled one or more of the offers, and providing one or more rewards for participation in the offers.

The subscriber identity module (SIM)/order management layer comprises features for tracking SIM cards, receiving orders for new SIM cards, managing SIM card orders, and otherwise monitoring and managing the distribution and use of SIM cards used to interact with the network of the deployment.

The central data orchestration layer provides storage of information that is used by the other layers. The central data orchestration layer may provide one or more databases comprising information relating to network deployments, user interactions, offers, rates, interface elements, and other information used by the other layers of the stack. The central data orchestration layer may be configured to receive queries from the system and respond with the requested data.

The journey management layer provides a roadmap for user engagement with a particular deployment. Different stages of the journey management layer may be supported by other layers of the stack. For instance, the activate stage may be supported by the user management/identity layer for generating and storing new user identifiers, the core charging/rating/billing layer for identifying a billing rate and other rules for a deployment, SIM/order management layer for providing a SIM card to the user, and other layers relating to the activation of an account. The different stages of journey management may be used to identify features for supporting new or existing users by identifying which stage of the journey management the user is in and either routing requests based on the stage or providing different features to the user and/or network operator based on the stage.

The discover stage may include information relating to marketing, such as interface elements for advertisements, offer rates, referral opportunities, demographic targeting, and other features relating to providing information to future users. The signup stage may include options for generating a new account for a particular network deployment, including an interface to be provided to new users with options for generating an account, information relating to the network deployment, and interface elements which are unique to the network deployment.

The activate stage comprises features relating to the activation of a new account, such as the generation of a unique user identifier, a mapping of user identifier to a particular device, storage of information relating to a particular plan accepted by the user, such as billing rates and data caps, and other onboarding steps for beginning the tracking of a new user. The activate stage may additionally include the identification of a new SIM and/or electronic SIM (e-SIM) card for a new user and features relating to the transfer of the SIM or e-SIM card to the new user.

The engage stage comprises features relating to user engagement, such as the generation of new offers for the user, loyalty program rewards for the user, data tracking and billing for the user, and other features relating to user engagement. Similarly, the support stage comprises features relating to user support, such as technical support, billing support, and other support features. The virality stage comprises features relating to the spreading or popularization of the deployment through offers, rewards, and other internet related communications.

At a higher level, the stack is separated into self-service channels and assisted channels. Self-service channels comprise features which allow users to solve their own problems with a platform, such as frequently asked questions, tutorials, help interfaces, and other features which do not require direct interactions with network operator users. The assisted channels comprise features for facilitating interactions between the users and the network operator, such as support chats, support tickets, e-mail, phone services, and other means of connecting users to agents of the network operator.

The stack described herein is a stack comprising a growth platform and related services. The stack provides all features necessary to create a deployment of a network to a plurality of users. Thus, if the network operator comprises a telecommunications company, the stack represents software and services provided by the server computer 102 for deployment of a particular network to a plurality of users, including advertising, generation and execution of rules relating to the deployment, interface elements which uniquely identify the deployment, data corresponding to activated users of the deployment, and software features for any support, offers, marketing, sales, catalogs, or other forms of user interaction with the network operator.

Multiple Deployment Overview

The stack example of FIG. 1B is described above relating to a singular deployment. Thus, for a particular network, the stack has been described as providing all the features for a singular deployment of the network. A singular deployment, in this context, comprises a set of particular rules, offers, pricing, and interface elements representing the deployment. As an example, a singular deployment of the network may comprise a particular brand which is treated as a particular entity which provides particular offers and rates with interface elements identifying the particular entity. While the example was described with reference to a singular deployment, the stack may also be used to manage multiple deployments, thereby allowing for the generation, management, and support of separate deployments with separate rules and interface elements through a single software stack.

Figure 1C:
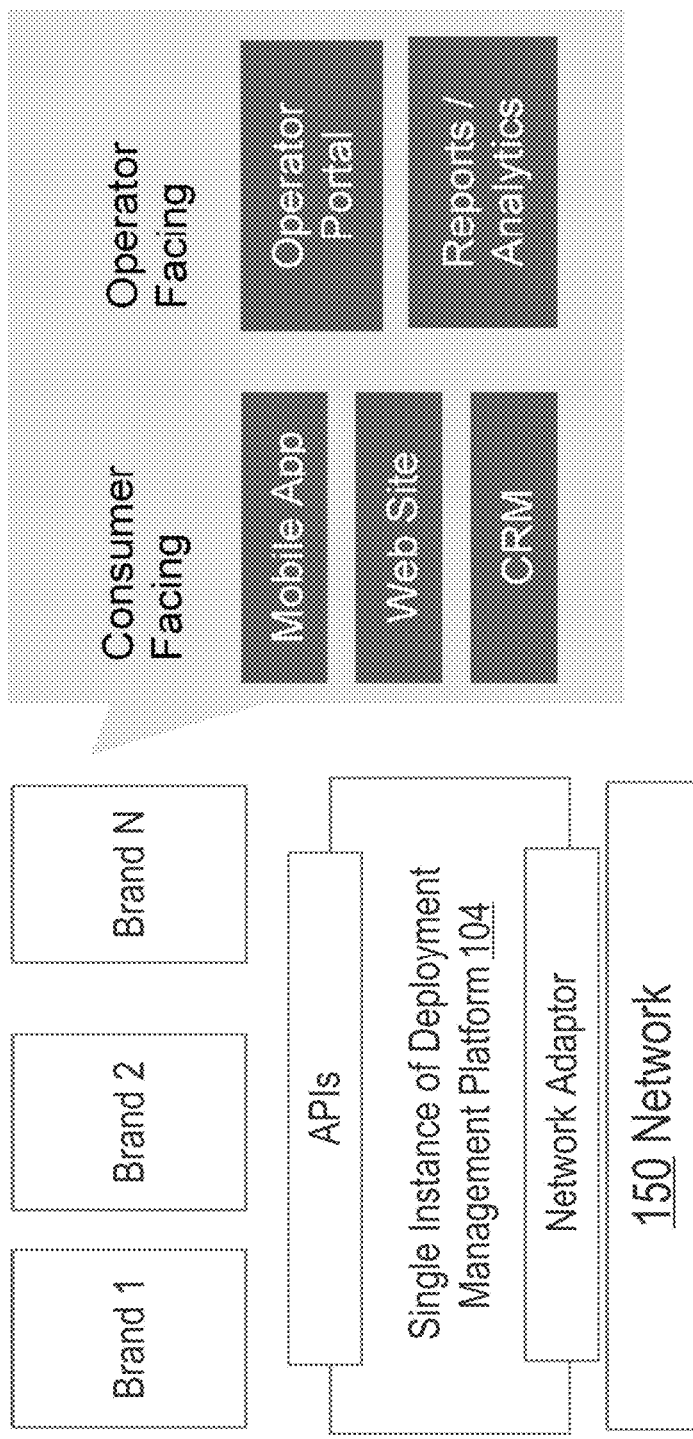
FIG. 1C depicts an example configuration of a plurality of deployments.

FIG. 1C depicts an example configuration of a plurality of deployments. In FIG. 1C, a single instance of the deployment management platform 104 communicates with network 150 using a network adaptor. The single instance of the deployment platform 104 uses application programming interfaces (APIs) to deploy a plurality of brands. Each of the plurality of brands utilizes network 150 through the network adaptor, but comprises different rules and interface elements. Thus, the stack depicted in FIG. 1B may comprise data relating to each of Brand 1, Brand 2, and Brand N with identifiers of the brand identifying a particular deployment. For example, different groups of rates may apply to different brands. Thus, the core charging/rating/billing layer in FIG. 1B may identify charges, rates, and billing for each of the plurality of brands.

Each brand depicted in FIG. 1C comprises consumer facing aspects and operator facing aspects. The consumer facing aspects may include a mobile application, a website for the brand, and a CRM layer relating to the brand. Thus, despite utilizing the same network, each brand may comprise different rules, different interfaces, and different support systems for the users. The operator facing aspects comprise an operator portal for managing the brands and reports/analytics relating to the brands. Each brand depicted in FIG. 1C is its own deployment which is managed through the single instance of deployment management platform 104. Thus, the single instance of deployment management platform 104 is able to provide separate applications, interface elements, and rules to a plurality of deployments while allowing each deployment to be managed through the single instance of the deployment management platform 104.

The server computer may provide options for generating a plurality of deployments from a single deployment. Thus, the brands depicted in FIG. 1C may comprise sub-brands of a single deployment generated by the network operator through the deployment management platform 104. The deployment management platform 104 may include tools for sub-dividing a single deployment, including generating different offers for each sub-deployment, generating different front-end interfaces for each sub-deployment, specifying different support interfaces for each sub-deployment, and/or providing different rules for each sub-deployment.

Figure 1D:
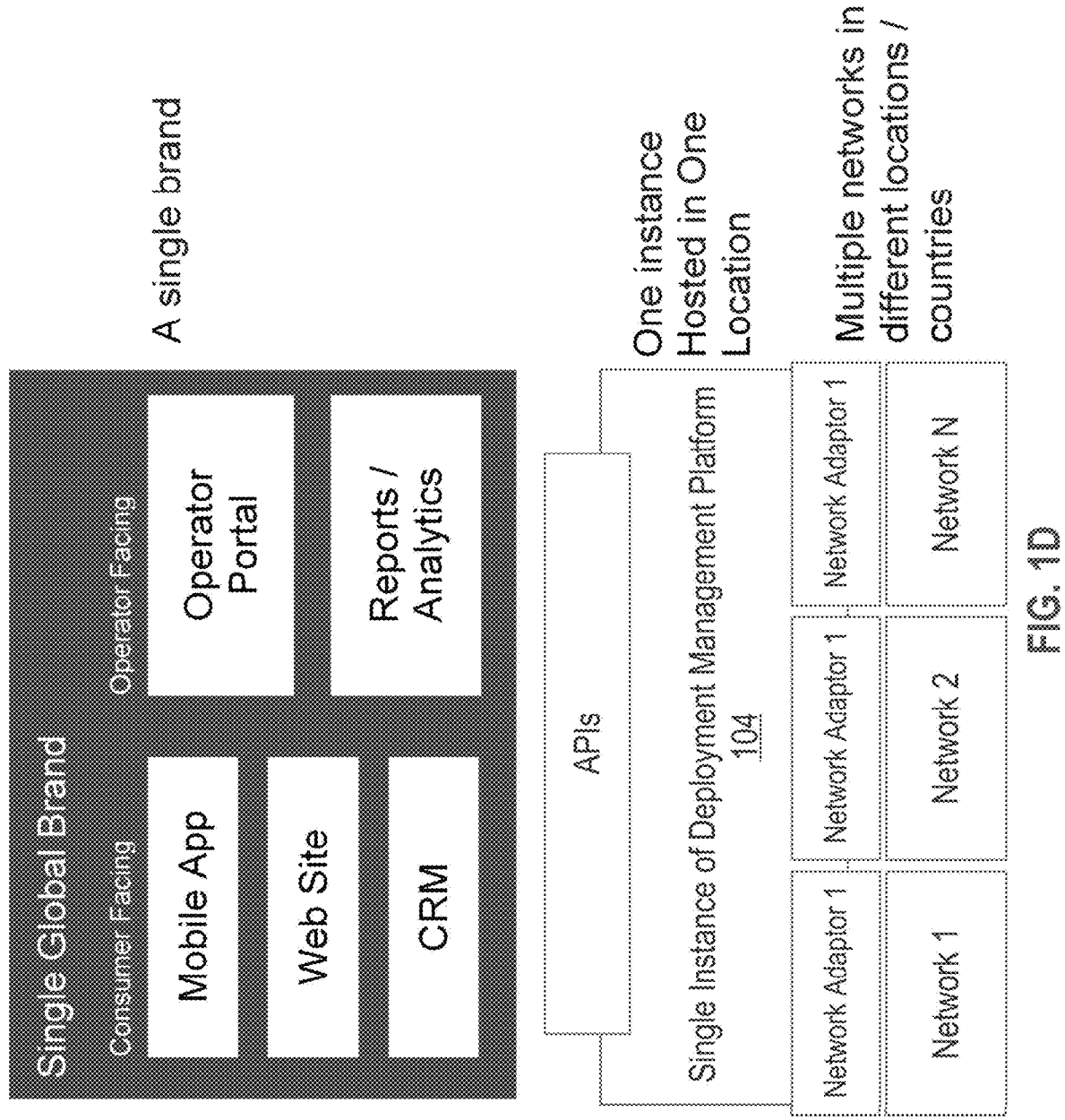
FIG. 1D depicts an example configuration of a single deployment across a plurality of networks.

FIG. 1D depicts an example configuration of a single deployment across a plurality of networks. In FIG. 1D, a single instance of the deployment management platform 104 communicates with a plurality of networks through a plurality of network adaptors. Network 1 communicates with the single instance of the deployment management platform 104 through network adaptor 1 and network N communicates with the single instance of the deployment management platform 104 through network adaptor N. By using a plurality of network adaptors, the single instance of deployment management platform 104 may be used to manage a plurality of networks across a plurality of locations or countries through a single instance of the platform hosted in a single location. As with FIG. 1C, the brand managed through the single instance of deployment management platform 104 comprises a mobile application, website, and CRM on the consumer facing side and an operator portal and reports/analytics on the operator facing side.

Multiple Deployment Example

Figure 2:
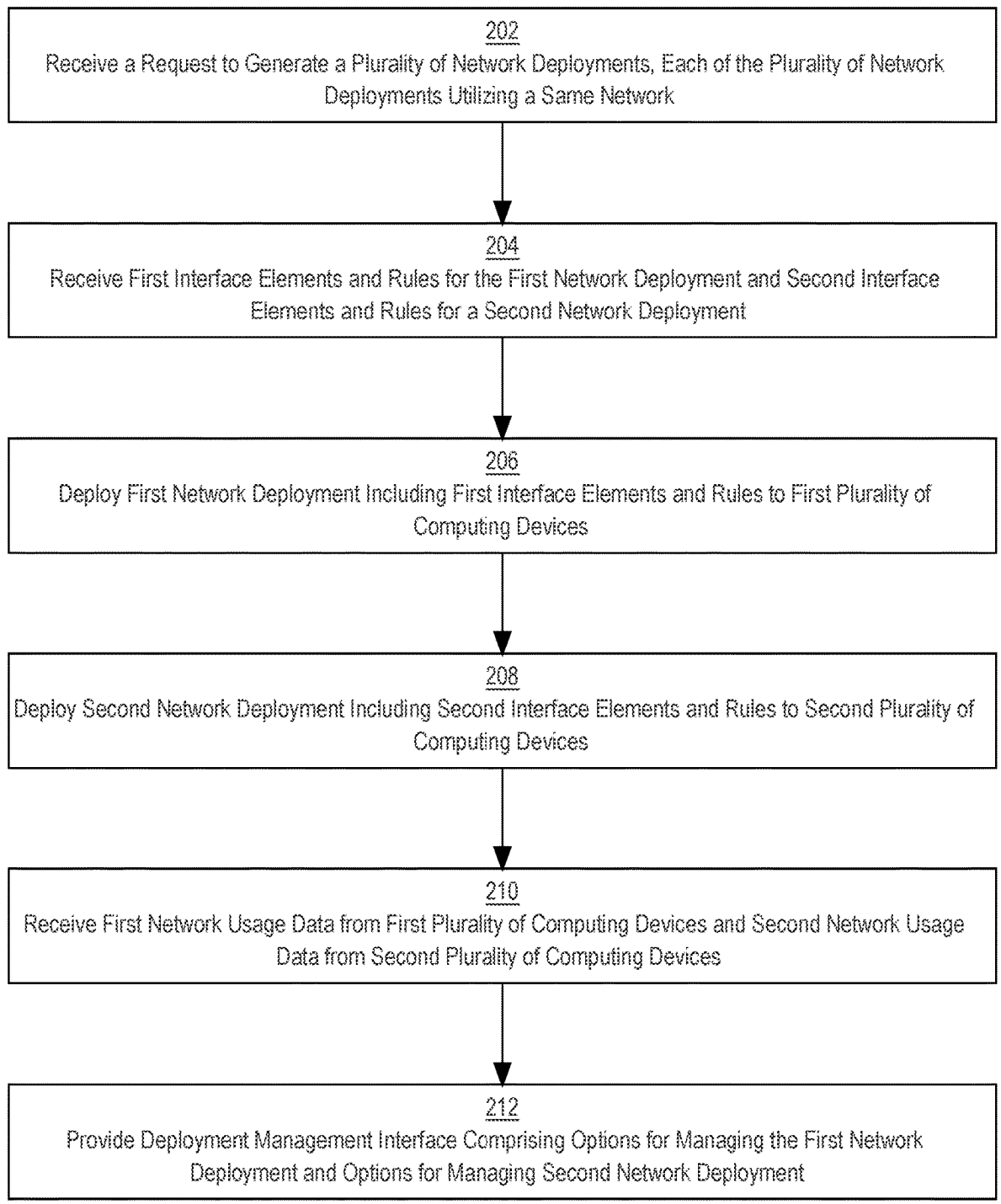
FIG. 2 depicts an example method of generating multiple deployments for a particular network.

FIG. 2 depicts an example method of generating multiple deployments for a particular network. FIG. 2, and all other flow diagrams herein, may serve as a plan or algorithm for programming one or more sets of computer-executable instructions which when compiled, loaded and executed cause performing the functions that are shown in the drawing figure. That is, FIG. 2 is intended to illustrate in functional terms the executable instructions that could be used for one implementation or embodiment of the appended claims, at the same level of detail that is customarily used by persons having an ordinary level of skill in the art to communicate among themselves about how to engineer or architect computer program(s) that accomplish the specified functions.

At step 202, the system receives a request to generate a plurality of network deployments, each of the plurality of network deployments utilizing the same network. For example, the system may provide an interface to a network operator, such as an application interface or web interface, for generating different network deployments. The interface may include options for specifying rules for each deployment and/or interface elements for each deployment, such as separate applications, graphical designs, and other interface elements relating to the different deployments.

At step 204, the system receives first interface elements and rules for a first network deployment and second interface elements and rules for a second network deployment. For example, the system may receive, for the first network deployment, data specifying rules, such as billing rates, data caps, prices, plan descriptions, or any other rules related to the first network deployment. The system may also receive interface elements, such as a brand logo, and/or an application comprising first interface elements to be deployed to a plurality of users. The system may additionally receive different data for the second network deployment, including different rules and interface elements.

As a practical example, the first network deployment may comprise a first brand for a network. The brand may be associated with specific deals, data rates, users, websites, and/or applications. The first brand may also be associated with specific images or other display elements, such as a brand name and logo. The system may receive data identifying the first brand, the rules for the first brand, the displayed name and logos for the first brand, and any other first brand information. The system may additionally receive a first application for the first brand which allows a user to connect to the brand's network. The second network deployment may comprise a second brand for the same network. Thus, while both brands execute through the same network, the two brands may be implemented using different rules, applications, names, and interface elements, such that the two brands appear to be two different networks which follow two different sets of rules.

At step 206, the system sends the first network deployment including the first interface elements and rules to a first plurality of computing devices. For example, the system may provide a platform to the network operator for advertising of the network deployment as well as sending an application and/or SIM card to mobile devices for the network deployment, thereby allowing the mobile devices to access the network operated by the network operator. The deployment may include the application for accessing the network, interface elements identifying the deployment, and/or rules for tracking, rating, and billing based on network usage.

At step 208, the system sends the second network deployment including the second interface elements and rules to a second plurality of computing devices. For example, the platform provided by the system may provide options for creating and sending data relating to both network deployments, including the advertising of each network and/or the sending of applications and/or SIM cards for each network. Thus, multiple deployments which utilize the same network but comprise different sets of rules and interface elements may be generated through the same platform and deployed to different computing devices, such that the different network deployments appear to be different networks.

At step 210, the system receives first network usage data from the first plurality of computing devices and second network usage data from the second plurality of computing devices. For example, the system may track network usage through the deployment management platform. The system may identify, for each client computing device, which network deployment was sent to the client computing device, thereby determining which rules to apply to the client computing device. When the system receives usage data from client computing devices that received the first network deployment, the system may tag the data to indicate that the data refers to the first network deployment. Similarly, when the system receives usage data from client computing devices that received the second network deployment, the system may tag the data to indicate that the data refers to the second network deployment.

At step 212, the system provides a deployment management interface comprising options for managing the first network deployment and options for managing the second network deployment. The deployment management interface may identify network usage separately for each deployment. The interface may additionally include tools for managing both deployments simultaneously by applying one or more changes to both deployments through a single request and/or tools for managing both deployments individually. Thus, the interface may provide tools for both creating/modifying deployments and for managing the deployments after they have been sent to client computing devices.

As described with reference to FIG. 1B and FIG. 1C, one software stack can support a plurality of deployments which utilize the same network. Thus, when data is received from a client computing device, such as network usage data, support requests or other user requests, or other tracked client computing device data, the data may be tagged with an identifier corresponding to the network deployment. The system may then display, through the network stack, data relating to the first network deployment and data relating to the second network deployment, thereby facilitating user interactions as part of a network deployment where the interactions appear to be performed by a separate entity than interactions with users that received a different deployment.

Deployment Support

Figure 3:
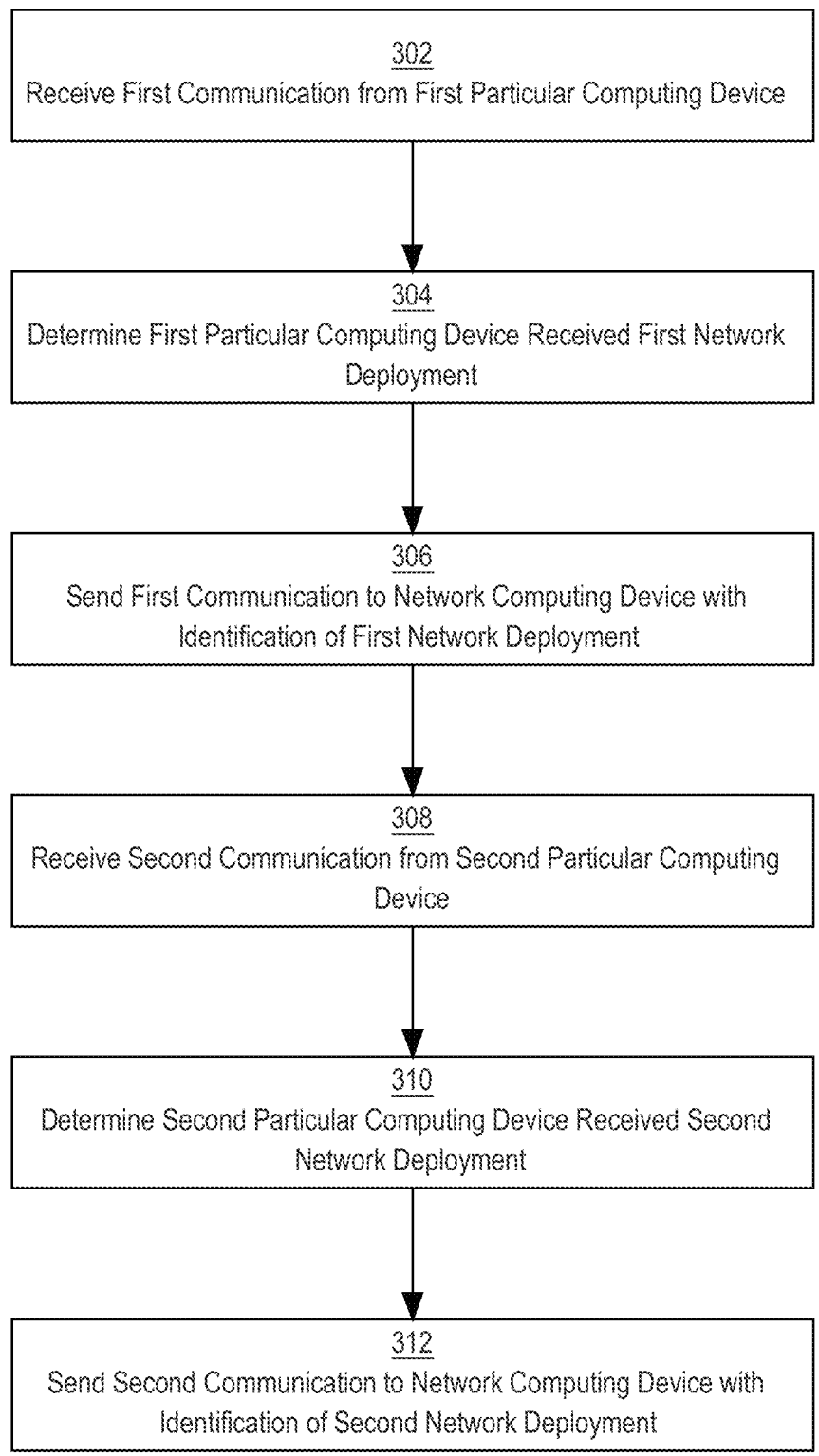
FIG. 3 depicts an example method of providing support for multiple deployments for a particular network through a support interface.

FIG. 3 depicts an example method of providing support for multiple deployments for a particular network through a support interface.

At step 302, the system receives a first communication from a first particular computing device. The first communication may comprise an offer request, a support request, a network usage request, or other engagement with the network and/or network operator. The first communication may additionally or alternatively comprise tracked data being sent to the network operator, such as tracked mobile network usage, tracked data usage, or other tracked data relating to the first particular client computing device.

At step 304, the system determines that the first particular computing device received the first network deployment. For example, the system may store data comprising unique user and/or device identifiers with corresponding network deployment identifiers. When the system receives the communication from the first particular computing device, the system may compare a device identifier of the first particular computing device with the stored device identifiers in order to identify the corresponding network deployment.

At step 306, the system sends the first communication to a network computing device with an identification of the first network deployment. For example, the system may cause display of an interface comprising the first communication and/or data aggregating the first communication with other data relating to the first network deployment. As a practical example, an interface provided by the deployment management platform 104 may comprise a technical support interface which separates support tickets by network deployment, such that tickets relating to client computing devices which received the first network deployment are separately displayed in the interface or include a visual indication that the ticket relates to the first network deployment, such as design features relating to the first network deployment or a field which identifies the first network deployment.

At step 308, the system receives a second communication from a second particular computing device. The second communication may comprise an offer request, a support request, a network usage request, or other engagement with the network and/or network operator. The second communication may additionally or alternatively comprise tracked data being sent to the network operator, such as tracked mobile network usage, tracked data usage, or other tracked data relating to the first particular client computing device. Communications from computing devices receiving both deployments may be routed through the same system and managed through the same stack.

At step 310, the system determines the second particular computing device received a second network deployment. For example, the system may compare a device identifier of the second particular computing device with stored data identifying network deployments for device identifiers to determine which network deployment the second particular computing device received.

At step 312, the system sends the second communication to the network computing device with an identification of the second network deployment. For example, the system may display, through the deployment management platform, data relating to the second deployment separately from the data relating to the first deployment, thereby allowing the network operator to manage communications differently based on deployment.

As a practical example, if a first user received a first network deployment referred to as Net1 and encountered a network connectivity problem, the first user may send a support ticket to the server computer. The server computer may determine that the first user received the Net1 deployment and send the support ticket to the network operator. The network operator may then respond to the support ticket utilizing response rules corresponding to the Net1 deployment. Additionally or alternatively, the network operator may forward all tickets corresponding to the Net1 deployment to a first group of computing devices while tickets corresponding to other deployments are forwarded to a different group of computing devices.

As another practical example, the first user may set up an account with the Net1 network deployment where a particular rating structure corresponds to the account. When communications are received from the first user which are routed through the network operated by the network operator, the system may determine that the first user corresponds to the Net1 network deployment. The system may then identify rules for rating the communication based on stored data for the Net1 network deployment which corresponds to the user's account. Thus, particular rates and rules may be used based on the network deployment the user received.

Deployment Identification

In an embodiment, the system identifies which deployments to display to client computing devices based on one or more features of the client computing devices. For example, the server computer may receive a request to display one or more network deployments. The request may take the form of a search for a network deployment and/or a request to load an advertisement for one or more deployments on a browser or through an application.

In response to receiving the request to display one or more network deployments, the server computer may identify one or more features of the client computing device. The one or more features may comprise any of one or more of applications installed on the particular client computing device, data regarding a user of the client computing device, geographic location of the particular client computing device, or device type of the particular client computing device. The data regarding the user may include user age, preferences, use history, or other data supplied to the server computer 102.

Based on the one or more features, the server computer may select a particular network deployment to send to the client computing device. For example, the server computer may provide options in the deployment management platform to specify targeting rules for network deployments based on user features. For instance, the network operator may specify that a first deployment is displayed to users of ages 15-25 while a second deployment is displayed to users of ages 26-40. Rules may be simple, such as the one described above, or complex, such as utilizing a plurality of features.

Once a deployment is selected, the server computer may display the deployment on the client computing device. For example, the server computer may send data relating to the deployment, such as an image, link, or deployment related information, to the client computing device. As the deployments appear to utilize different networks, the server computer may select a particular deployment instead of a different deployment, thereby targeting particular deployments to particular client computing devices.

Benefits of Certain Embodiments

The systems and methods described herein improve a computing device's ability to generate and manage a plurality of deployments. By utilizing a single software stack to manage a plurality of deployments utilizing a same network, the system is able to reduce a number of utilized programs, thereby increasing efficiency of the computing system. Additionally, the utilization of a single software stack for management of multiple deployments decreases storage costs, as the system does not need to store information which is duplicated across deployments.

The systems and methods described herein additionally provide improvements to the network operator computing device's efficiency as all data is received through an endpoint of the software stack and tagged with information identifying a corresponding deployment. Thus, the systems and methods improve management of the plurality of deployments by providing such management options through a single interface and software stack, thereby removing duplicate work which would usually be performed through separate interfaces and/or programs.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 4:
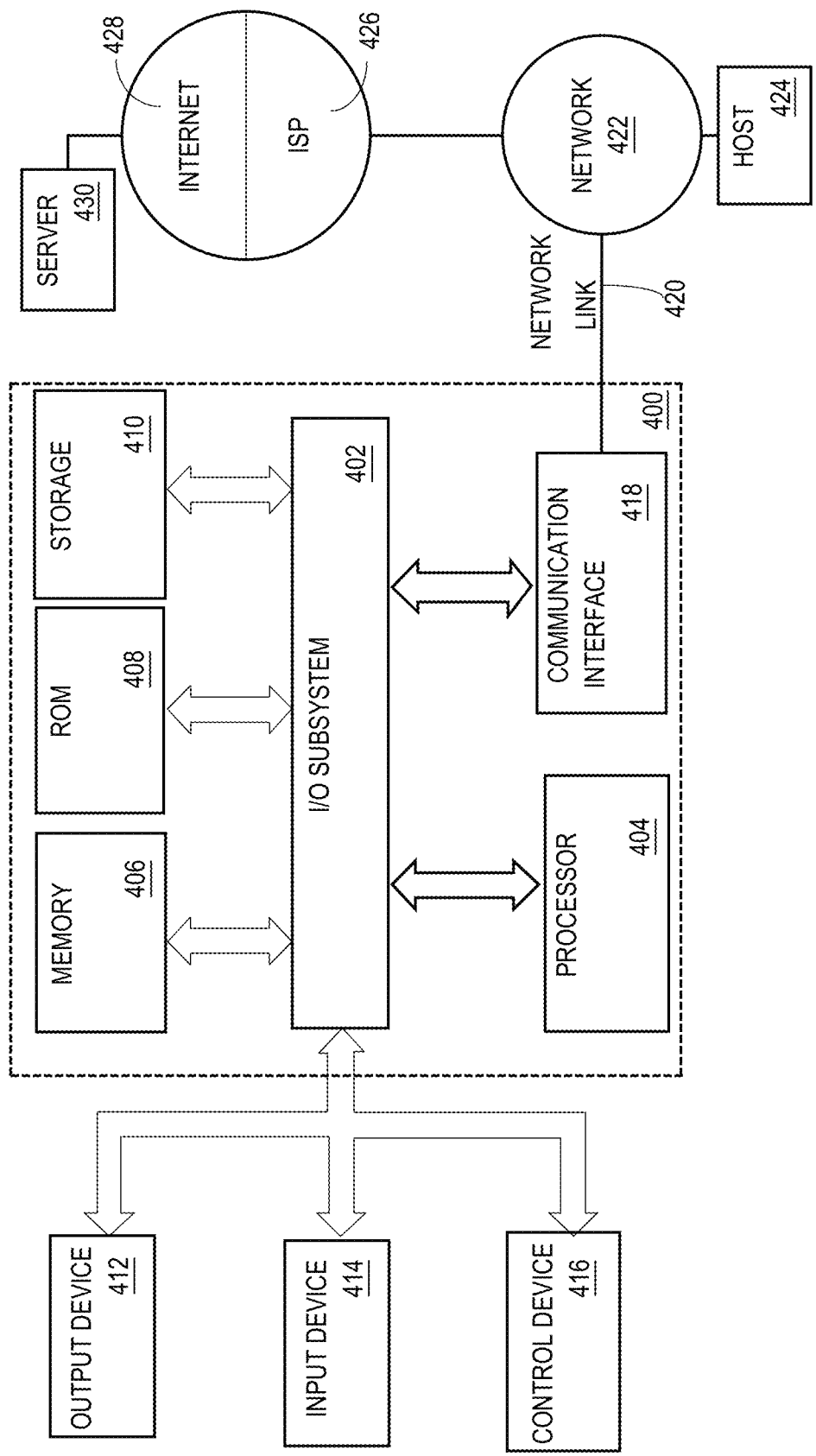
FIG. 4 is a block diagram that illustrates a computer system upon which an embodiment may be implemented.

For example, FIG. 4 is a block diagram that illustrates a computer system 400 upon which an embodiment may be implemented. Computer system 400 includes a bus 402 or other communication mechanism for communicating information, and a hardware processor 404 coupled with bus 402 for processing information. Hardware processor 404 may be, for example, a general purpose microprocessor.

Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Such instructions, when stored in non-transitory storage media accessible to processor 404, render computer system 400 into a special-purpose machine that is customized to perform the operations specified in the instructions.

Computer system 400 further includes a read only memory (ROM) 408 or other static storage device coupled to bus 402 for storing static information and instructions for processor 404. A storage device 410, such as a magnetic disk, optical disk, or solid-state drive is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

Computer system 400 may implement the techniques described herein using customized hard-wired logic, one or more ASICs or FPGAs, firmware and/or program logic which in combination with the computer system causes or programs computer system 400 to be a special-purpose machine. According to one embodiment, the techniques herein are performed by computer system 400 in response to processor 404 executing one or more sequences of one or more instructions contained in main memory 406. Such instructions may be read into main memory 406 from another storage medium, such as storage device 410. Execution of the sequences of instructions contained in main memory 406 causes processor 404 to perform the process steps described herein. In alternative embodiments, hardwired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 410. Volatile media includes dynamic memory, such as main memory 406. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 402. Transmission media can also take the form of acoustic or light waves, such as those generated during radio-wave and infra-red data communications.

Various forms of media may be involved in carrying one or more sequences of one or more instructions to processor 404 for execution. For example, the instructions may initially be carried on a magnetic disk or solid-state drive of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card, cable modem, satellite modem, or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are example forms of transmission media.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution.

Cloud Computing

The term "cloud computing" is generally used herein to describe a computing model which enables on-demand access to a shared pool of computing resources, such as computer networks, servers, software applications, and services, and which allows for rapid provisioning and release of resources with minimal management effort or service provider interaction.

A cloud computing environment (sometimes referred to as a cloud environment, or a cloud) can be implemented in a variety of different ways to best suit different requirements. For example, in a public cloud environment, the underlying computing infrastructure is owned by an organization that makes its cloud services available to other organizations or to the general public. In contrast, a private cloud environment is generally intended solely for use by, or within, a single organization. A community cloud is intended to be shared by several organizations within a community; while a hybrid cloud comprises two or more types of cloud (e.g., private, community, or public) that are bound together by data and application portability.

Generally, a cloud computing model enables some of those responsibilities which previously may have been provided by an organization's own information technology department, to instead be delivered as service layers within a cloud environment, for use by consumers (either within or external to the organization, according to the cloud's public/private nature). Depending on the particular implementation, the precise definition of components or features provided by or within each cloud service layer can vary, but common examples include: Software as a Service (SaaS), in which consumers use software applications that are running upon a cloud infrastructure, while a SaaS provider manages or controls the underlying cloud infrastructure and applications. Platform as a Service (PaaS), in which consumers can use software programming languages and development tools supported by a PaaS provider to develop, deploy, and otherwise control their own applications, while the PaaS provider manages or controls other aspects of the cloud environment (i.e., everything below the run-time execution environment). Infrastructure as a Service (IaaS), in which consumers can deploy and run arbitrary software applications, and/or provision processing, storage, networks, and other fundamental computing resources, while an IaaS provider manages or controls the underlying physical cloud infrastructure (i.e., everything below the operating system layer). Database as a Service (DBaaS) in which consumers use a database server or Database Management System that is running upon a cloud infrastructure, while a DbaaS provider manages or controls the underlying cloud infrastructure, applications, and servers, including one or more database servers.

In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the disclosure, and what is intended by the applicants to be the scope of the disclosure, is the literal and equivalent scope of the set of claims that issue from this application, in the specific form in which such claims issue, including any subsequent correction.

What is claimed is:

1. A network management system comprising:
one or more processors;
a memory storing instructions which, when executed by the one or more processors, cause performance of:
receiving, through a network management platform from a network computing device, a request to generate a plurality of cellular network deployments, each of the cellular network deployments comprising a deployment of a cellular network utilizing a particular digital communication network;
receiving, through the network management platform from the network computing device, data specifying first interface elements and first rules for a first cellular network deployment and second interface elements and second rules for a second cellular network deployment;
sending the first cellular network deployment to a first plurality of client computing devices, the first cellular network deployment including the first interface elements and first rules;
sending the second cellular network deployment to a second plurality of client computing devices, the second cellular network deployment including the second interface elements and second rules;
receiving first network usage data from the first plurality of client computing devices based upon using the first cellular network deployment and receiving second network usage data from the second plurality of client computing devices based upon using the second cellular network deployment;
providing, to the network computing device, the first network usage data with an identification of the first cellular network deployment and the second network usage data with an identification of the second cellular network deployment.

2. The system of claim 1, wherein the instructions, when executed by the one or more processors, further cause performance of:
receiving a first support communication from a first particular client computing device of the first plurality of client computing devices;
determining that the first particular client computing device received the first cellular network deployment;
sending the first support communication to the network computing device with an identification of the first cellular network deployment;
receiving a second support communication from a second particular client computing device of the second plurality of client computing devices;
determining that the second particular client computing device received the second cellular network deployment;
sending the second support communication to the network computing device with an identification of the second cellular network deployment;
wherein the first support communication and the second support communication are both displayed through a deployment management interface.

3. The system of claim 1, wherein the instructions, when executed by the one or more processors, further cause performance of:
receiving a request to access the particular digital communication network from a particular client computing device;
determining that the particular client computing device received the first cellular network deployment and, in response, implementing the first rules with respect to the particular client computing device's access to the particular digital communication network.

4. The system of claim 1, wherein the instructions, when executed by the one or more processors, further cause performance of:
receiving a request from a particular client computing device for a cellular network deployment;
identify one or more particular features of the particular client computing device;
based, at least in part, on one or more particular features, selecting the first cellular network deployment over the second cellular network deployment;
causing display of an option to select the first cellular network deployment.

5. The system of claim 4, wherein the one or more particular features comprise one or more of applications installed on the particular client computing device, data regarding a user of the particular client computing device, geographic location of the particular client computing device, or device type of the particular client computing device.

6. The system of claim 1, wherein the first rules and the second rules comprise one or more of network usage rates, network data usage limits, messaging usage limits, voice usage limits, network plan pricing, or network speeds.

7. The system of claim 1, wherein the instructions, when executed by the one or more processors, further cause performance of:
receiving, through the network management platform from the network computing device, a request to additionally utilize a second digital communication network for the first cellular network deployment;
wherein sending the first cellular network deployment to a first plurality of client computing devices comprises sending, to a first subset of the first plurality of client computing devices, the first cellular network deployment utilizing the particular digital communication network and sending, to a second subset of the first plurality of client computing devices, the first cellular network deployment utilizing the second digital communication network.

8. One or more non-transitory computer-readable media storing instructions which, when executed by one or more processors, cause performance of:
receiving, through a network management platform from a network computing device, a request to generate a plurality of cellular network deployments, each of the cellular network deployments comprising a deployment of a cellular network utilizing a particular digital communication network;
receiving, through the network management platform from the network computing device, data specifying first interface elements and first rules for a first cellular network deployment and second interface elements and second rules for a second cellular network deployment;

sending the first cellular network deployment to a first plurality of client computing devices, the first cellular network deployment including the first interface elements and first rules;

sending the second cellular network deployment to a second plurality of client computing devices, the second cellular network deployment including the second interface elements and second rules;

receiving first network usage data from the first plurality of client computing devices based upon using the first cellular network deployment and receiving second network usage data from the second plurality of client computing devices based upon using the second cellular network deployment;

providing, to the network computing device, the first network usage data with an identification of the first cellular network deployment and the second network usage data with an identification of the second cellular network deployment.

9. The one or more non-transitory computer-readable media of claim 8, wherein the instructions, when executed by the one or more processors, further cause performance of:

receiving a first support communication from a first particular client computing device of the first plurality of client computing devices;

determining that the first particular client computing device received the first cellular network deployment;

sending the first support communication to the network computing device with an identification of the first cellular network deployment;

receiving a second support communication from a second particular client computing device of the second plurality of computing devices;

determining that the second particular client computing device received the second cellular network deployment;

sending the second support communication to the network computing device with an identification of the second cellular network deployment;

wherein the first support communication and the second support communication are both displayed through a deployment management interface.

10. The one or more non-transitory computer-readable media of claim 8, wherein the instructions, when executed by the one or more processors, further cause performance of:

receiving a request to access the particular digital communication network from a particular client computing device;

determining that the particular client computing device received the first cellular network deployment and, in response, implementing the first rules with respect to the particular client computing device's access to the particular digital communication network.

11. The one or more non-transitory computer-readable media of claim 8, wherein the instructions, when executed by the one or more processors, further cause performance of:

receiving a request from a particular client computing device for a cellular network deployment;

identify one or more particular features of the particular client computing device;

based, at least in part, on the one or more particular features, selecting the first cellular network deployment over the second cellular network deployment;

causing display of an option to select the first cellular network deployment.

12. The one or more non-transitory computer-readable media of claim 11, wherein the one or more particular features comprise one or more of applications installed on the particular client computing device, data regarding a user of the particular client computing device, geographic location of the particular client computing device, or device type of the particular client computing device.

13. The one or more non-transitory computer-readable media of claim 8, wherein the first rules and the second rules comprise one or more of network usage rates, network data usage limits, messaging usage limits, voice usage limits, network plan pricing, or network speeds.

14. The one or more non-transitory computer-readable media of claim 8, wherein the instructions, when executed by the one or more processors, further cause performance of:

receiving, through the network management platform from the network computing device, a request to additionally utilize a second digital communication network for the first cellular network deployment;

wherein sending the first cellular network deployment to a first plurality of client computing devices comprises sending, to a first subset of the first plurality of client computing devices, the first cellular network deployment utilizing the particular digital communication network and sending, to a second subset of the first plurality of client computing devices, the first cellular network deployment utilizing the second digital communication network.

15. A method comprising:

receiving, through a network management platform from a network computing device, a request to generate a plurality of cellular network deployments, each of the cellular network deployments comprising a deployment of a cellular network utilizing a particular digital communication network;

receiving, through the network management platform from the network computing device, data specifying first interface elements and first rules for a first cellular network deployment and second interface elements and second rules for a second cellular network deployment;

sending the first cellular network deployment to a first plurality of client computing devices, the first cellular network deployment including the first interface elements and first rules;

sending the second cellular network deployment to a second plurality of client computing devices, the second cellular network deployment including the second interface elements and second rules;

receiving first network usage data from the first plurality of client computing devices based upon using the first cellular network deployment and receiving second network usage data from the second plurality of client computing devices based upon using the second cellular network deployment;

providing, to the network computing device, the first network usage data with an identification of the first cellular network deployment and the second network usage data with an identification of the second cellular network deployment.

16. The method of claim 15, further comprising:

receiving a first support communication from a first particular client computing device of the first plurality of client computing devices;

determining that the first particular client computing device received the first cellular network deployment;

sending the first support communication to the network computing device with an identification of the first cellular network deployment;

receiving a second support communication from a second particular client computing device of the second plurality of computing devices;

determining that the second particular client computing device received the second cellular network deployment;

sending the second support communication to the network computing device with an identification of the second cellular network deployment;

wherein the first support communication and the second support communication are both displayed through a deployment management interface.

17. The method of claim 15, further comprising:

receiving a request to access the particular digital communication network from a particular client computing device;

determining that the particular client computing device received the first cellular network deployment and, in response, implementing the first rules with respect to the particular client computing device's access to the particular digital communication network.

18. The method of claim 15, further comprising:

receiving a request from a particular client computing device for a cellular network deployment;

identify one or more particular features of the particular client computing device;

based, at least in part, on the one or more particular features, selecting the first cellular network deployment over the second cellular network deployment;

causing display of an option to select the first cellular network deployment.

19. The method of claim 18, wherein the one or more particular features comprise one or more of applications installed on the particular client computing device, data regarding a user of the particular client computing device, geographic location of the particular client computing device, or device type of the particular client computing device.

20. The method of claim 15, wherein the first rules and the second rules comprise one or more of network usage rates, network data usage limits, messaging usage limits, voice usage limits, network plan pricing, or network speeds.

21. The method of claim 15, further comprising:

receiving, through the network management platform from the network computing device, a request to additionally utilize a second digital communication network for the first cellular network deployment;

wherein sending the first cellular network deployment to a first plurality of client computing devices comprises sending, to a first subset of the first plurality of client computing devices, the first cellular network deployment utilizing the particular digital communication network and sending, to a second subset of the first plurality of client computing devices, the first cellular network deployment utilizing the second digital communication network.

* * * * *